(12) United States Patent
Welker et al.

(10) Patent No.: US 7,681,347 B1
(45) Date of Patent: Mar. 23, 2010

(54) EDGE LIT SIGN WITH ILLUMINATED IMAGE

(75) Inventors: Brian Hart Welker, Pfafftown, NC (US); Gregory Scott Isaacs, Mount Airy, NC (US)

(73) Assignee: Imageworks Display and Marketing Group, Winston-Salem, NC (US)

( * ) Notice: Subject to any disclaimer, the term of this patent is extended or adjusted under 35 U.S.C. 154(b) by 0 days.

(21) Appl. No.: 11/448,187

(22) Filed: Jun. 7, 2006

(51) Int. Cl.
G09F 13/18 (2006.01)
(52) U.S. Cl. .......................................... 40/546; 40/579
(58) Field of Classification Search ................... 40/546, 40/579
See application file for complete search history.

(56) References Cited

U.S. PATENT DOCUMENTS

| | | | |
|---|---|---|---|
| 3,895,380 A * | 7/1975 | Nishina et al. | 340/815.55 |
| 4,521,835 A * | 6/1985 | Meggs et al. | 362/470 |
| 4,811,507 A | 3/1989 | Blanchet | |
| 4,947,300 A * | 8/1990 | Wen | 362/183 |
| 4,967,317 A * | 10/1990 | Plumly | 362/613 |
| 5,027,258 A | 6/1991 | Schoniger et al. | |
| 5,036,248 A | 7/1991 | McEwan et al. | |
| 5,178,447 A | 1/1993 | Murase et al. | |
| 5,276,591 A | 1/1994 | Hegarty | |
| 5,433,024 A | 7/1995 | Lerner | |
| 5,636,914 A | 6/1997 | Trusiani | |
| 5,788,356 A | 8/1998 | Watai et al. | |
| 5,964,051 A | 10/1999 | Loeber et al. | |
| 6,023,869 A | 2/2000 | Durbin | |
| 6,026,602 A * | 2/2000 | Grondal et al. | 40/570 |
| 6,042,248 A | 3/2000 | Hannah et al. | |
| 6,076,294 A | 6/2000 | Durbin | |
| 6,079,838 A | 6/2000 | Parker et al. | |
| 6,296,376 B1 | 10/2001 | Kondo et al. | |
| 6,308,444 B1 * | 10/2001 | Ki | 40/546 |
| 6,331,915 B1 * | 12/2001 | Myers | 359/599 |
| 6,341,440 B1 | 1/2002 | Lee | |
| 6,481,130 B1 | 11/2002 | Wu | |
| 6,481,131 B2 * | 11/2002 | Gianotti et al. | 40/546 |
| 6,530,164 B2 * | 3/2003 | Gai | 40/546 |
| 6,615,520 B2 | 9/2003 | Landers, Jr. et al. | |
| 6,644,823 B2 | 11/2003 | Egawa et al. | |
| 6,691,443 B1 | 2/2004 | Slayden | |
| 6,705,033 B1 * | 3/2004 | Greene et al. | 40/546 |
| 6,712,481 B2 | 3/2004 | Parker et al. | |
| 6,824,286 B2 | 11/2004 | Sugiyama | |
| 6,860,628 B2 | 3/2005 | Robertson et al. | |
| 6,895,705 B2 | 5/2005 | Hillstrom et al. | |
| 6,981,784 B2 | 1/2006 | Dubuc | |
| 7,024,809 B1 * | 4/2006 | Poma | 40/546 |

\* cited by examiner

*Primary Examiner*—Lesley Morris
*Assistant Examiner*—Shin Kim
(74) *Attorney, Agent, or Firm*—Robert W. Pitts

(57) ABSTRACT

A sign is edge lit and illuminated by an array of light emitting diodes disposed along an edge of a light transmissive panel. A light diffusion surface, which can be formed by a series of serrations on the panel edge, disperses light from the discrete light emitting diodes in the array. A geometric figure, which can be text or graphics or both is formed on one face of the panel by grooves, which redirect diffused light so that an illuminated image, corresponding to the geometric figure, can be seen on the front of the panel. The grooves forming the figure and the light diffusion surface comprise parts of a one-piece panel, and the grooves and the light diffusion surface can be formed when the panel is injection molded.

16 Claims, 10 Drawing Sheets

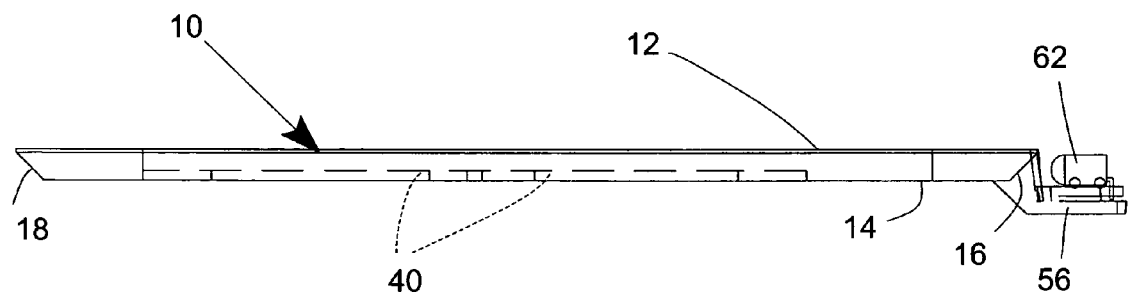
FIG 4
FIG 5
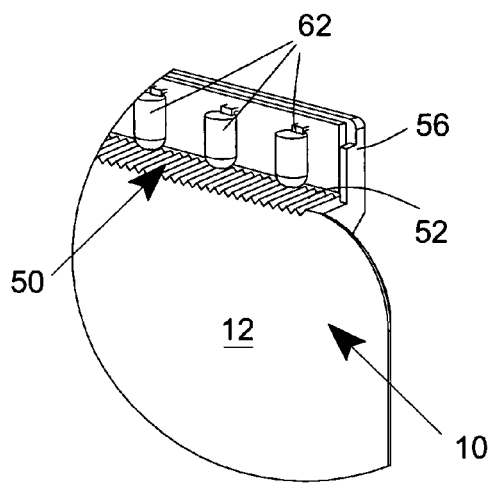
FIG 6
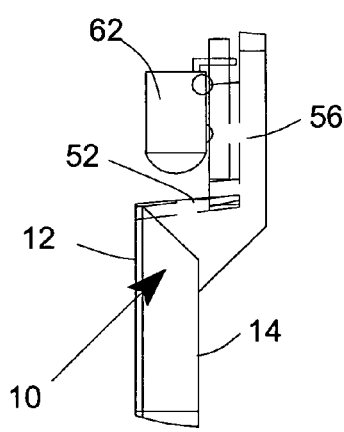

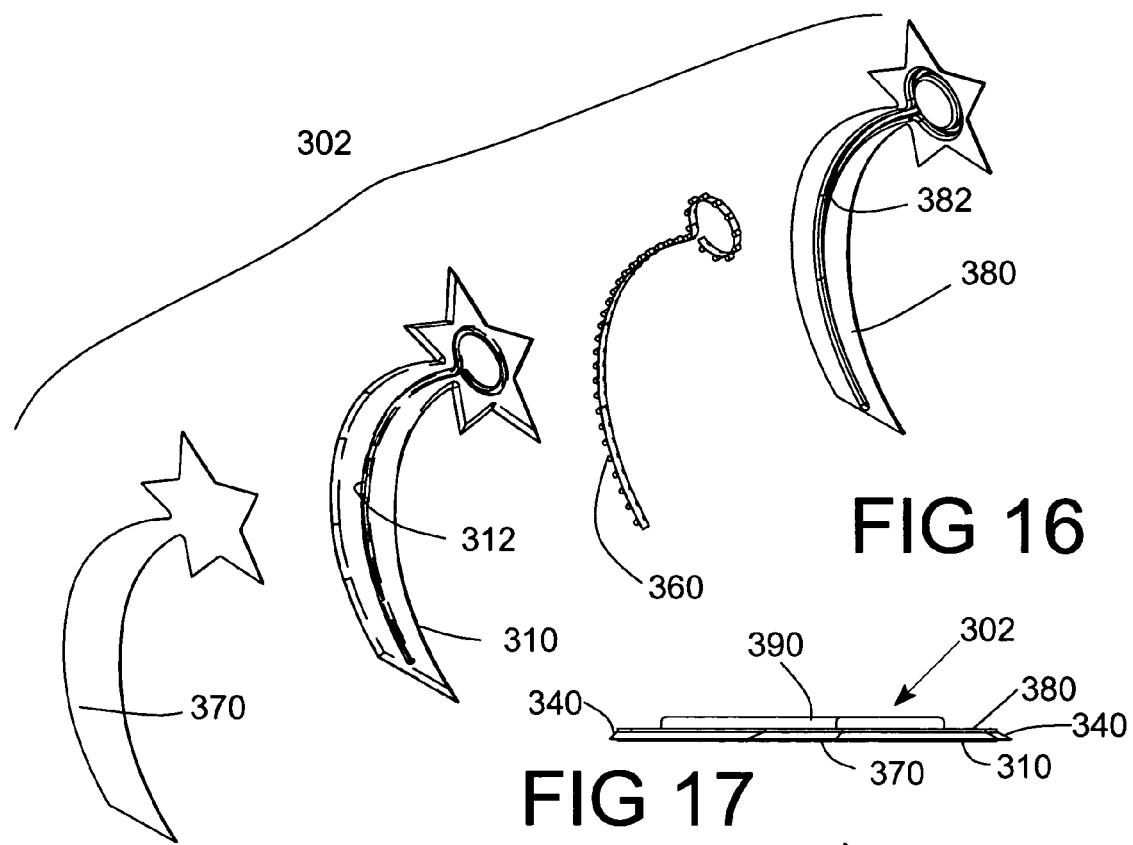
FIG 16
FIG 17
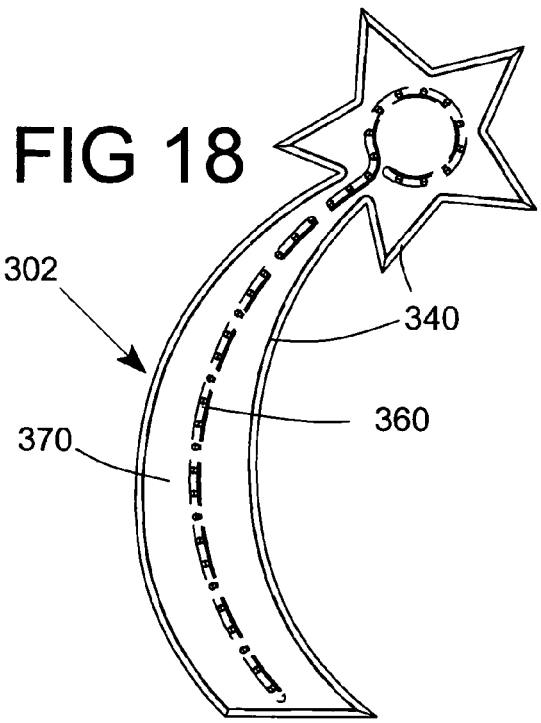
FIG 18

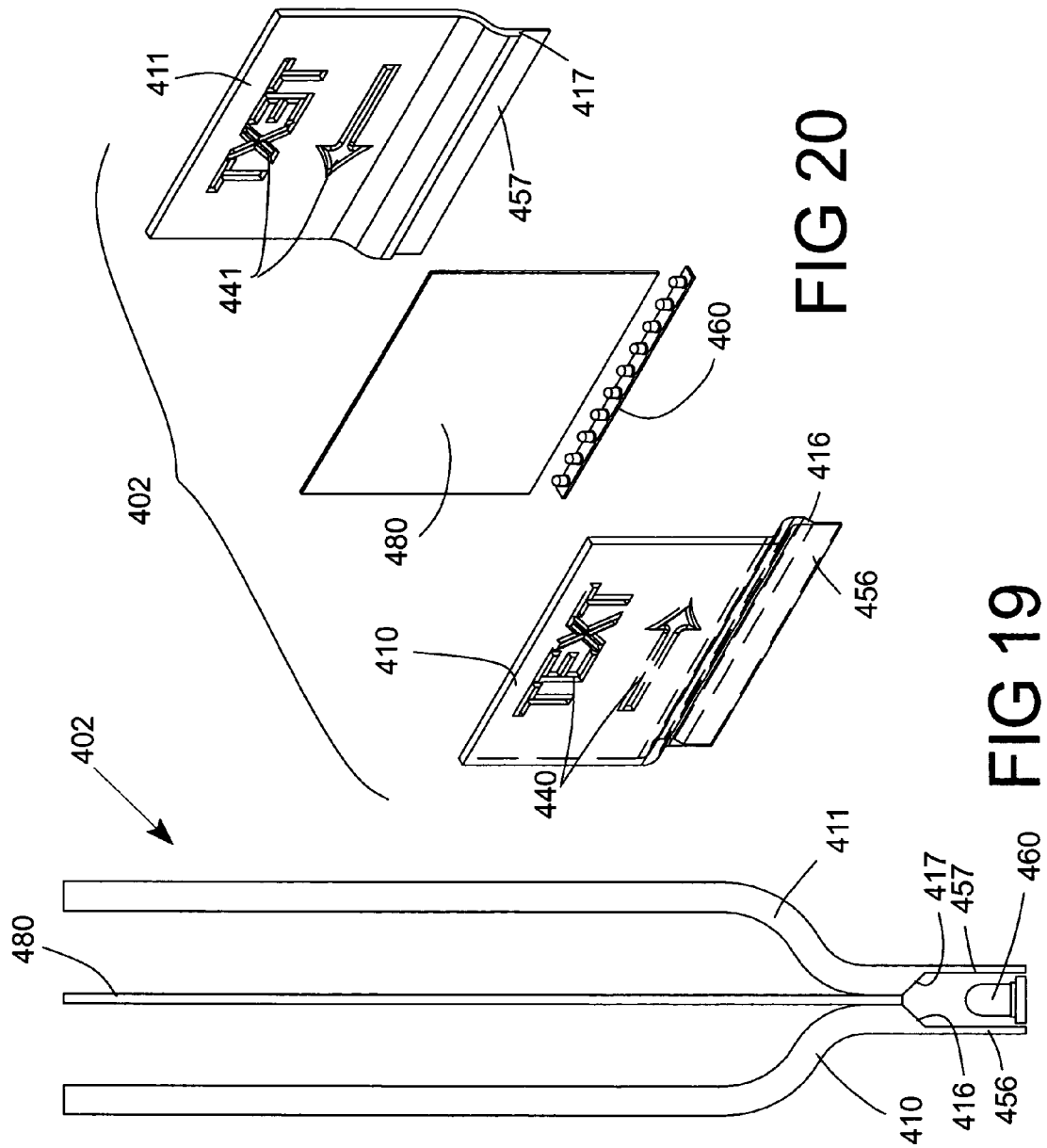

EDGE LIT SIGN WITH ILLUMINATED IMAGE

BACKGROUND OF THE INVENTION

1. Field of the Invention

This invention relates to signs illuminated by edge lighting. This invention also relates to the use of discrete light sources, such as light emitting diodes to illuminate a figure, so that only the figure is illuminated relative to the substrate on which the figure is formed.

2. Description of the Prior Art

Edge lit signs or signboards employing fluorescent lamps mounted adjacent one edge of a light transmissive panel have been employed to illuminate characters or figures on one face of the panel. Since a standard tubular fluorescent lamp emits a substantially uniform illumination along its entire length, it will uniformly illuminate a figure or a series of characters extending between opposite ends of the fluorescent lamp and presumably along substantially the entire length of the sign.

It has been recognized that light emitting diodes possess certain advantages over fluorescent lamps when used in edge lit illuminated signs. U.S. Pat. No. 6,341,440 is one example of the use of a series light emitting diodes or LED's disposed in a linear array in such a sign. Of course, standard LED's comprise discrete light sources when compared to a standard tubular fluorescent lamp. In order to illuminate a series of characters on a clear panel, it is therefore necessary to disperse or diffuse the light emitted by discrete LED's. U.S. Pat. No. 6,341,440 employs a light diffusion strip with a series of semicircular holes in which individual LED's are located. This diffusion strip is separate from the clear panel containing display characters or ornamental markings, and the diffusion strip is located adjacent one edge of the clear panel. According to this patent, the light is diffused so that the light emitted by individual LED's can enter an edge of the panel with a uniform hue, which presumably means that the light from individual LED's is diffused before entering the clear panel.

U.S. Pat. No. 6,615,520 discloses another example of an edge lit sign employing discrete LED's. In this version, LED's, fiber optic devices or halogen bulbs are fitted in tight fitting orifices along one edge of the panel. These orifices are described as tight fitting and well polished to allow for optimum transmission of light from the discrete light sources into the display board. Improved light transmission and efficiency is apparently of paramount importance. To diffuse the light, this device apparently employs reflective strips located in a receptacle in which the display board is mounted. The edges of the display board slope away from the centrally mounted LED's so that reflective walls of the panel insure little loss of light.

U.S. Pat. No. 6,481,130 is another example of an edge lit sign that employs a separate member to disperse the light form discrete LED's. This device employs both a reflector and a lens portion.

These devices, however, use a separate diffuser and light transmissive panel and appear to require precision in mounting the LED's relative to either the diffuser or the clear panel. These devices also appear to use a rather small number of LED's. For example, U.S. Pat. No. 6,341,440 shows three sets of red, blue and green LED's and U.S. Pat. No. 6,615,520 shows only three LED's. It would appear to follow that these devices must either employ relatively strong LED's or the displayed light intensity must be relatively weak. These devices also employ multiple components that appear to require precision in assembly.

The instant invention employs a light transmissive panel that includes both geometric figures or display characters and a diffusion surfaces that are integral part of the one-piece panel. This simplifies construction and provides an economical means for employing a relatively larger plurality of discrete light sources, such as LED's.

SUMMARY OF THE INVENTION

A sign in accordance with this invention incorporates a means for illuminating an edge lit image. A panel fabricated from a light transmitting material includes a figure formed by at least one groove recessed into one face of the panel and formed by sides formed at an acute angle relative to the face of the panel. A light diffusion surface is formed along one edge of the panel. The light diffusion surface extends transversely relative to the face of the panel. The grooves, recessed into the face of the panel, and the light diffusion surface are parts of a one-piece substrate forming the panel. An array of discrete light sources is disposed along the one edge of the panel so that light shines through the light diffusion surface to be dispersed to evenly shine through panel to strike the sides forming at least one groove to form an illuminated edge lit image conforming to the sides of the at least one groove.

In one version, this edge lit sign includes a molded plastic panel having opposed faces and peripheral edges extending between the opposed faces. The outline of a shape is formed by a series of grooves on the molded plastic panel, which extend into one face of the panel. An array of light diffusion surfaces is formed on the molded plastic panel and extends into one edge of the panel. Light from an array of discrete light sources is dispersed by the array of light diffusion surfaces so that the diffused light shines on the outline of the shape with the grooves redirecting the light so that an illuminated image corresponding to the outline of the shape is visible on one face of the panel.

In this illuminated sign, adjacent light emitting diodes are spaced apart between opposite ends of the linear light source array. The geometric design formed on the flat panel has a length, parallel to the linear array, greater than the spacing between adjacent light emitting diodes. The multiple light emitting diodes illuminate the geometric design, which forms a discontinuity on one surface of the flat panel, to redirect light engaging indented surfaces forming the geometric design. The diffusion surface on the edge of the flat panel is juxtaposed to the linear array so that the diffusion surface laterally disperses light emitted by the light emitting diodes adjacent the one edge of the flat panel to more evenly illuminate the geometric design.

BRIEF DESCRIPTION OF THE DRAWINGS

FIG. 4 is a side view of the subassembly shown in FIG. 3 showing the light emitting diode array mounted on a shelf extending from the panel.

FIG. 5 is a detail view showing the position of the light emitting diodes relative to a light diffusion surface located along the illuminated edge of the panel.

FIG. 6 is a side view showing the position of the light emitting diodes relative to the panel and the light diffusion surface.

FIG. 16 is an exploded view of the major components of another embodiment of an edge lit sign in which an array of light emitting diodes is positioned between the grooves which will form the illuminated image.

FIG. 17 is a top view of the assembled sign shown in FIG. 16.

FIG. 18 is a front view of the sign of FIGS. 16 and 17, showing an image in the form of a shooting star, which is formed by illuminated edges of the sign, with the hidden array of light emitting diodes being shown in phantom.

FIG. 19 is a side view of another embodiment of the instant invention in which the light from a single row of discrete light sources is used to illuminate images on two panels.

FIG. 20 is an exploded three dimensional view of the main components of the edge lit panel configuration of FIG. 19.

DETAILED DESCRIPTION OF THE PREFERRED EMBODIMENTS

Figure 1:
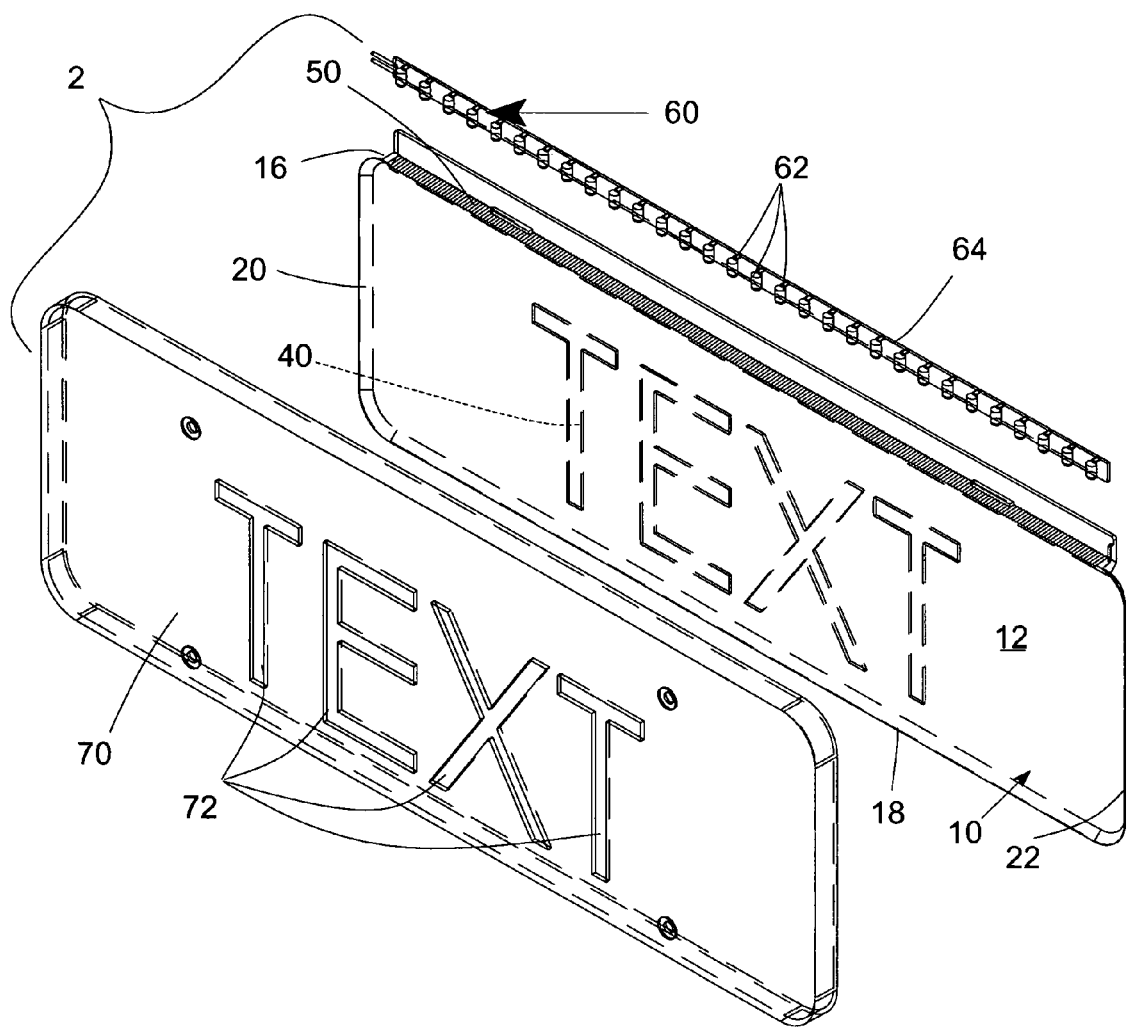
FIG. 1 is an exploded front view showing the basic components of an edge lit sign.
Figure 2:
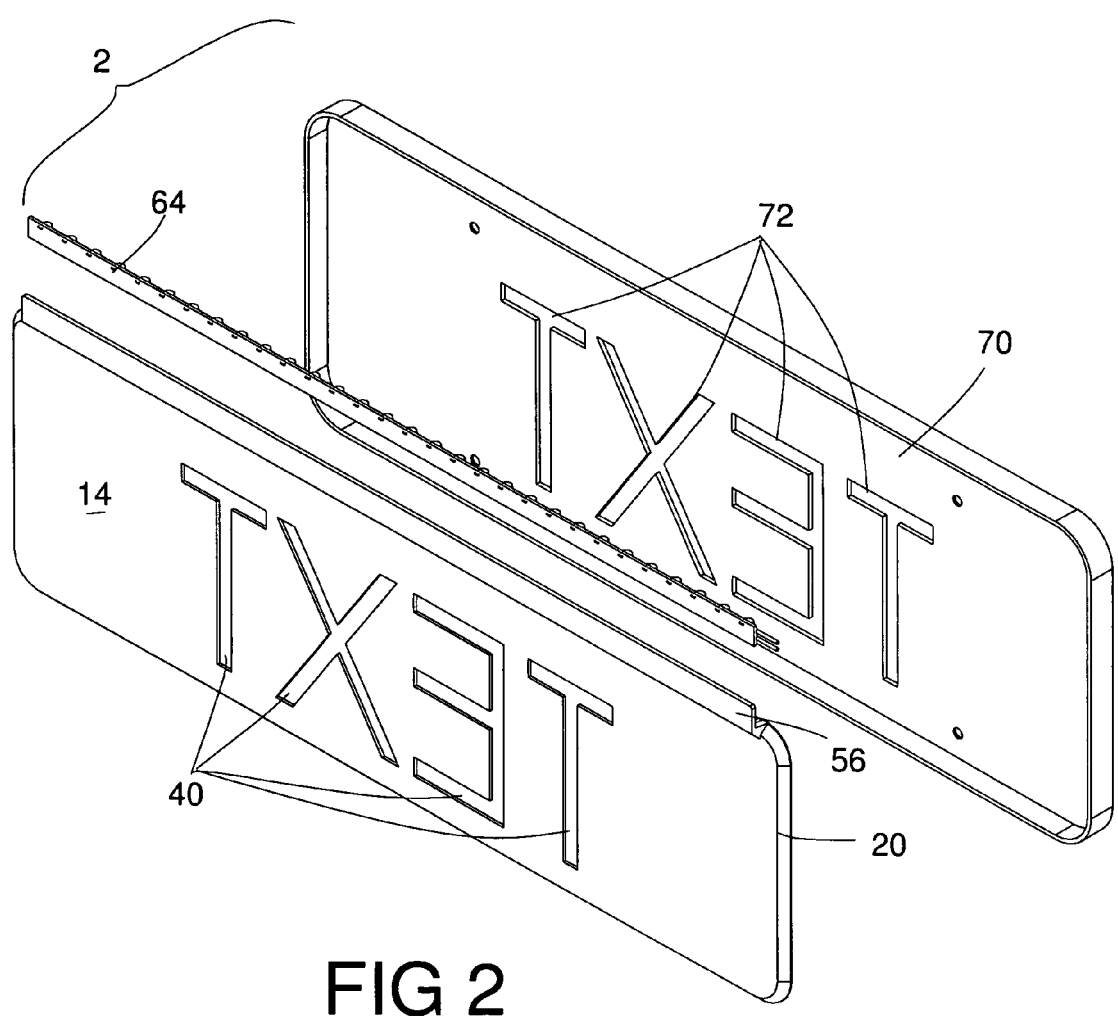
FIG. 2 is an exploded rear view showing the basic components of the edge lit sign shown in FIG. 1.

The preferred embodiment of the edge lit illuminated sign 2 according to this invention includes a one-piece panel 10 with a geometric figure 40 and a light diffusion surface 50, both formed on the one-piece panel. A linear array 60 of spaced discrete light sources, such as light emitting diodes 62, is mounted along one illuminated edge 16 of the panel 10. The geometric figure 40 is depicted here as representative text, but it should be understood that the figure 40 is not limited to textural material, and is especially suited to represent artwork, such as advertising logos or trademarks. In the preferred embodiment, this one-piece panel 10 is molded from a light transmissive or transparent material, such as an acrylic. In the preferred embodiment, the geometric figure 40 and the light diffusion surface 50 are both formed as molded features when the panel 40 is injection molded. It should be understood, however, that in other embodiments, either or both the geometric figure 40 or the light diffusion surface 50 can be formed by other means, such as by machining or etching, after initial fabrication of the panel 10. A painted figure can also be formed on the panel. The geometric figure, regardless of the manner in which it is formed, will comprise a discontinuity on the flat panel, which will be illuminated by the light emitted by the discrete light sources that has been diffused before striking the geometric figure. As will be subsequently discussed in greater detail, secondary operations can be performed on the geometric figure 40 or the light diffusion surface 50, after they have been initially fabricated by molding, machining, etching or by other fabrication techniques.

The panel 10 can have any desired shape, but in the representative embodiment depicted herein, panel 10 has a generally rectangular shape having a length and width that are greater than the depth or thickness of the panel 10. In the embodiment depicted herein, the thickness of the panel 10 is approximately 0.188 inch. Typical thicknesses for molded panels could be from one-eighth inch to one-fourth inch.

Panel 10 has a front face 12, through which an edge illuminated image in the form of the geometric figure 40 is normally viewed. Front face 12 is parallel to a rear face 14, and in this embodiment the geometric figure 40 is formed by a series of grooves 42 indented into the rear panel face 14. It should be understood that the geometric figure 40 can also be defined by other types of surface discontinuities formed on the panel 10. For example, the surface may be roughened or painted and light incident upon that form of discontinuity will be refracted, although normally more light would be incident upon a groove than upon a shallow surface discontinuity. Whether the figure is formed by a surface discontinuity or by a groove, the discontinuity will tend to refract light, while the remainder of the surface, which is relatively smoother or polished than the surface, groove or edge forming the geometric figure to be illuminated, will reflect light back into the light transmissive panel so that the panel effectively forms a light guide retaining substantially all of the light emitted by the array of discrete light sources. An illuminated edge 16 extends between the parallel faces 12 and 14. A second edge 18 is located on a side opposite from the illuminated edge 16. As will be discussed in further detail, the second edge 18 can be a reflective edge. Side edges 20 and 22 form the remaining peripheral edges extending between opposed faces 12 and 14.

The individual light emitting diodes 62 forming the array 60 of discrete light sources are mounted on a conductive film or circuit board 64, which is in turn connected to a conventional source of electrical energy, not shown. Leads on the light emitting diodes extend at right angle relative to the axis of the light emitting diode, which in turn extend generally parallel to the flexible film circuit 64. Light emitting diodes or LED's 62 can be any of a number of types of standard LED's. The LED's 62 are all identical monochromatic LED's having the same color, although if desired LED's of different colors may be employed. In this embodiment, adjacent LED's are spaced apart by a distance of 0.5 inches. Spacings between LED's depend upon the application and spacings from 0.3 to 1.0 inches have been found suitable for certain applications. The LED's employed in this invention can be chosen from a variety of commercially available LED's. For example, the LED's can employ different lens so that angle through which light will be emitted through the lens can be chosen to meet the specific application. For example, a wide angle LED can be chosen for certain applications and an elliptical lens might be chosen for others, although for most applications a standard LED will be satisfactory.

In the embodiments depicted herein, the LED's 62 and the circuit board 64 forming the LED array 60 are mounted on a shelf 56, which extends beyond the illuminated edge 16. This shelf 56 comprises an integral extension of the one-piece molded panel. The flexible circuit 64 can be attached to the shelf 56 by conventional means, such as adhesives or mechanical fasteners. With the LED array 60 mounted in this manner, the individual LED's 62 can be positioned in close proximity to the illuminated edge 16 so that light will shine through the lens of the LED's 62 into the light transmissive panel 10. Although shelf 56 provides a convenient means for mounting the LED array, it should be understood that other means can be adopted for mounting the LED's 62 in close proximity to the illuminated edge 16. For example, the LED's could be mounted on a separate mounting bracket, which would in turn be attached to the panel 10.

Figure 8:
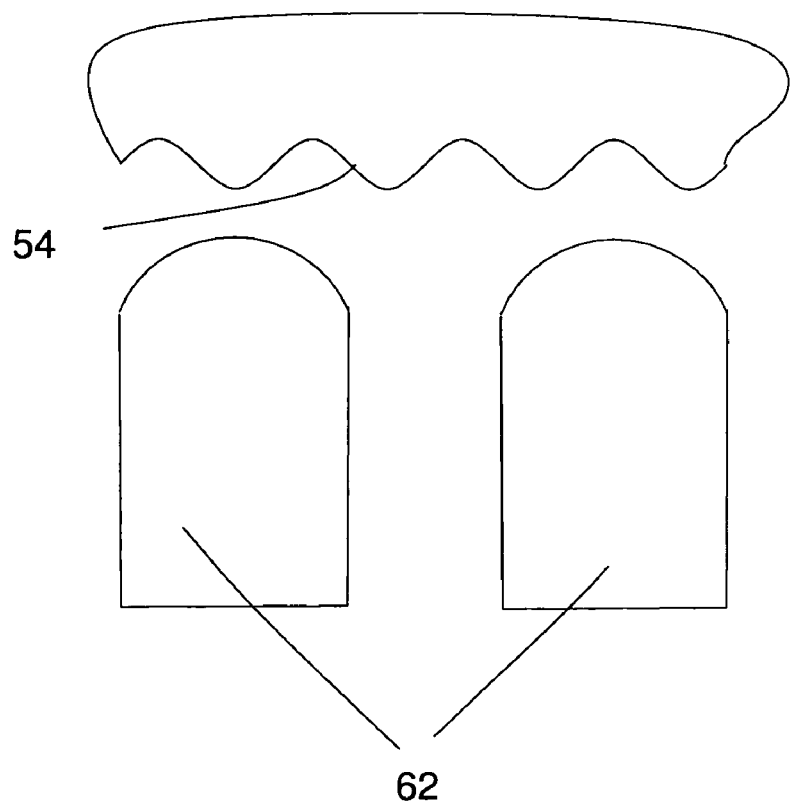
FIG. 8 is a view of an alternate version of a light diffusion surface that can be formed onto one edge of the sign panel.

The individual LED's 62 in the array 60 will emit light through the panel 10, between the faces 12 and 14, but that light will not evenly illuminate the figure 40 unless the light from the discrete sources is not diffused or dispersed to eliminate bright spots and dark spots. A diffusion surface 50 is formed along the illuminated edge 16 to disperse light from the discrete light sources 62 to more evenly illuminate the figure 40. In the preferred embodiment, the uneven diffusion surface 50 comprises a series of V-shaped grooves or serrations 52. The pitch between individual V-shaped grooves or serrations 52 is one-eight inch in this embodiment, although this spacing could be different where LED's of a different size or spacing were employed. The representative depth of these serrations is one-sixteenth inch. Light striking the serrations 52 will be refracted so that a relatively even sheet of light will emanate from the illuminated edge 16 and diffusion surface 30 to evenly blanket the figure 40. The image conforming to the figure 40 will then be evenly illuminated and will be visible without bright or dark spots. Although the V-shaped serrations 52 extend along the edge 16 and are transverse to and generally perpendicular to the panel faces 12 and 14, these serrations 52 can be easily formed when the panel 10 is injection molded. The serrations 52 do not overlap, so the panel 50 and serrations can be molded by a straight pull mold and no side pulls will be necessary. The cost of fabrication will therefore not be excessive. Although serrations can be employed to laterally diffuse light emitted by discrete light sources, it should be understood that other shapes or configurations can form the diffusion surface. For instance, as shown in FIG. 8, a sinusoidal edge may be molded or formed along one edge, and this sinusoidal surface will also diffuse light from discrete light sources.

Although the serrations 62 can be molded, it should of course be understood that these serrations can be machined into the plastic substrate from which the panel 10 is formed. Machining may be desirable when only a few signs are fabricated, while molding would be more cost effective when a large number of identical signs are to be fabricated. Of course the serrations 52 can be formed as part of a standard injection molded panel subassembly, with the desired image being formed, for example by machining, at a later time. This approach may be more economical for moderate volumes. The panel subassembly, on which LED's 62 are mounted, can even be sold by the fabricator to a customer who can then machine his particular figure on the panel 10. Another alternative method of fabrication would be to employ a standard injection mold die to mold the panel 10 and the edges 16, 18, 20 and 22 as well as the diffusion surface 50, but to employ separate die inserts for different versions of the geometric figure 40. In this way different versions of basically the same structure, with only the image changed, could be produced without the necessity and cost of fabricating entirely new molds for different signs. Surface discontinuities can be formed by other means, such as by laser etching. A figure may be painted on the surface of the flat panel, and this painted image too will comprise a surface discontinuity, which will be illuminated by the diffused light emitted by the discrete LED's.

In the preferred embodiment, the illuminated image will be formed when the dispersed or diffused light emitted by the LED array 60 strikes a figure 40 indented into one of the faces of the panel 10. In this embodiment, this figure is formed by grooves or a series of grooves 42 indented into the rear surface 14. When viewed from the rear, these grooves 42 form a mirror image of the figure that will be visible through the front face 12. As shown in FIG. 6, these grooves 42 have inclined sides 44. When light strikes these inclined sides the light is refracted or reflected due to the change in the index of refraction and the light is redirected. As light travels through the relatively homogenous transparent material between the front face 12 and the rear face 14 of the panel 10 from the illuminated edge 16, it is redirected, when the light strikes the inclined sides 44, so that the outline of the figure 40, defined by the grooves 42, is now visible as an illuminated image on the front face 12. Although it has been found that the grooves 42 can be formed on the front face 12, experience has shown that the character of the image is superior when the grooves are formed on the rear face.

Figure 3:
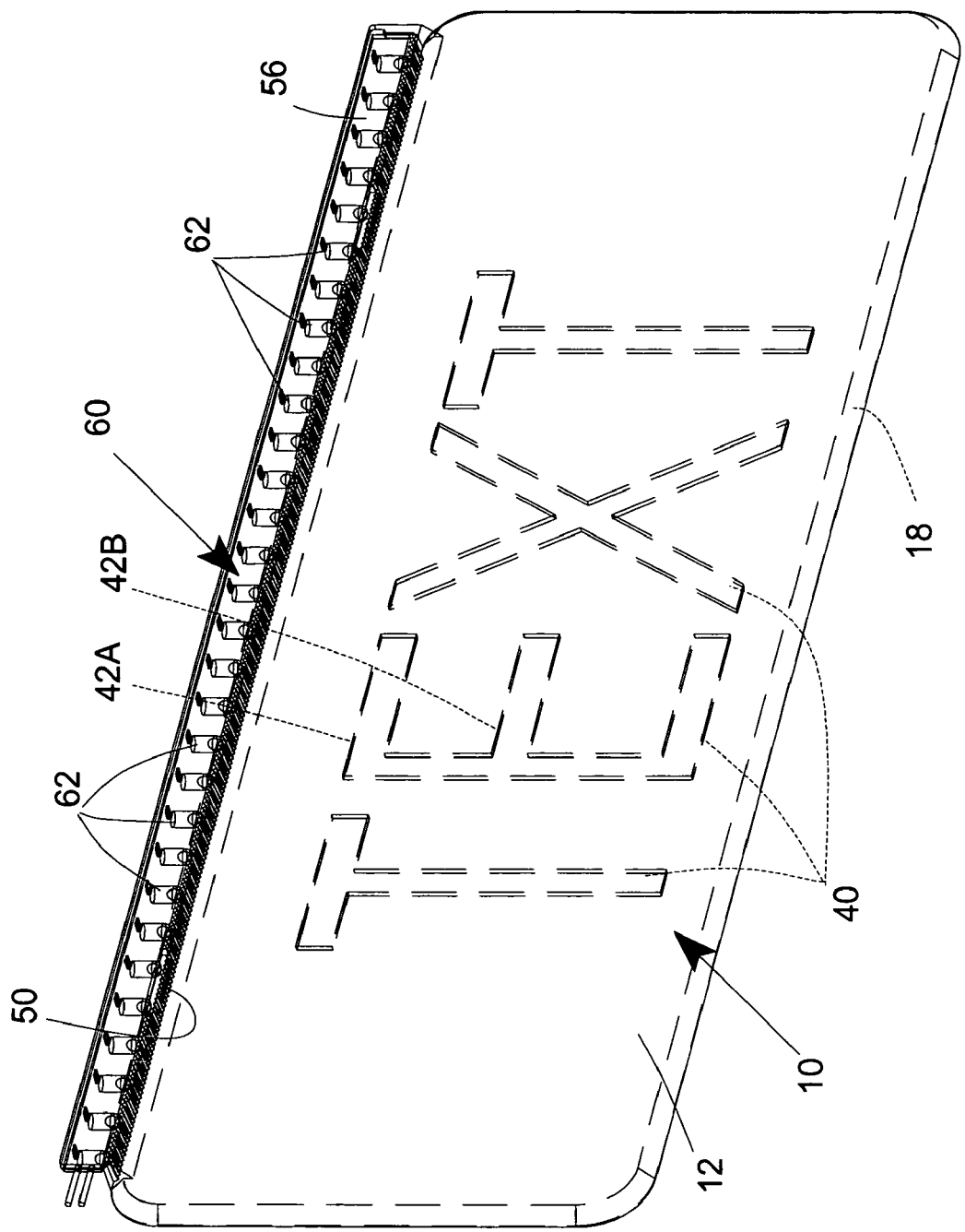
FIG. 3 is a front view of a panel on which a figure or figures to be illuminated are formed, with a linear array of light emitting diodes located along an illuminated edge of the panel.
Figure 7:
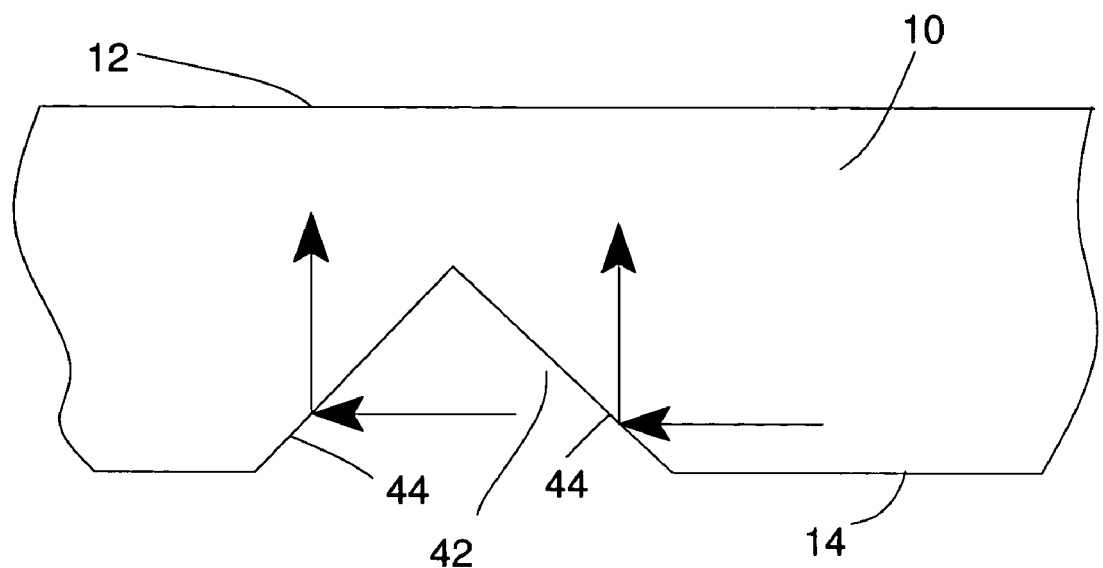
FIG. 7 is a view of one of the grooves formed in the panel to define the figure to be illuminated and demonstrating the manner in which light is redirected by the groove faces.

Although some of the light is redirected when it strikes the inclined groove sides 44, a portion of the light continues substantially along it original path. As shown in FIG. 3 groove 42A is located between illuminated edge 16 and the groove 42B. Since light continues to be propagated through panel 10, both grooves 42A and 42B are illuminated. A beveled reflective edge 18 located at the opposite extremity of the panel 10 from the illuminated edge is also inclined and acts as a reflective surface, redirecting light back into the grooves 42 to increase the brightness of the illuminated image.

The grooves 42 can be molded at the same time that the panel 10 is molded. However, a relatively smooth finish of the molded grooves 42 does not produce as bright an image as would be the case if the grooves 42 were rougher than would normally be achieved by injection molding. A brighter image can be obtained by a secondary treatment to the mold, which forms the molded grooves 42. Etching of the portion of molding die that form grooves 42 is one of a number of ways to produce this rougher finish. The surfaces on the die, which mold the grooves 42, can also be machined to form a rougher surface, which can then be transferred to the molded grooves 42. If the grooves 42 are machined rather than molded, the machining will leave a rougher surface than would normally result from molding. Therefore a secondary treatment is of less importance for machined grooves 42.

In order to enhance the illumination of the geometric figure, a beveled edge 18 is formed along the side edge opposite from and remote from the edge on which the diffusion surface 50 is formed. Light transmitted through the geometric figure and incident on a smooth beveled edge 18 will be at least partially reflected back through the transparent flat panel, where it will illuminate the geometric image from the opposite side, resulting in a brighter, more distinct image. The degree of reflection can be enhanced by polishing the beveled edge 18. Alternatively, the beveled edge may be roughened by an appropriate surface treatment formed either during molding of the panel or thereafter, so that light will not be reflected but will be refracted by this roughened edge and will be visible. In this manner a visible border may be defined around the sign.

The representative embodiment of the sign 2 also includes an opaque cover 70 with cutouts or openings 72 corresponding to the image produced by the geometric figure 40. This cover 70 conceals the panel 10 and the LED array 60, except for the illuminated image shining through the cutouts 72. However, it is not necessary to cover the entire panel 10, since only the image, here represented by the phrase "TEXT", resulting from illumination of the figure 40 will be lighted and visible when viewed through the front face 12. Of course, the LED array 60 would be visible, if not concealed. Alternative approaches to concealing the LED array 60 could include placing an opaque tape over the front of the LED array 60. A rim extending around the peripheral edges of the panel, including the illuminated edge 16, the LED array 60 and the diffusion surface 50 could also be employed. If the LED array 60 is located along the bottom edge, a stand into which the LED array, the illuminated edge 16 and the diffusion surface 50 would fit could also be employed. In this embodiment the remainder of the panel 10 would be free standing and visible, but the only illuminated portion would be the figure 40.

Figure 9:
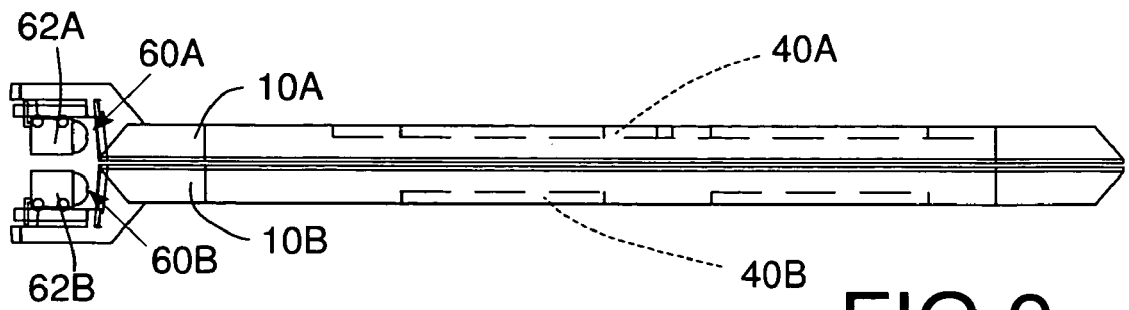
FIG. 9 is a view of a configuration in which two edge lit panels are disposed side by side so that LED's of different colors can illuminate different geometric designs in the two panels.
Figure 10:
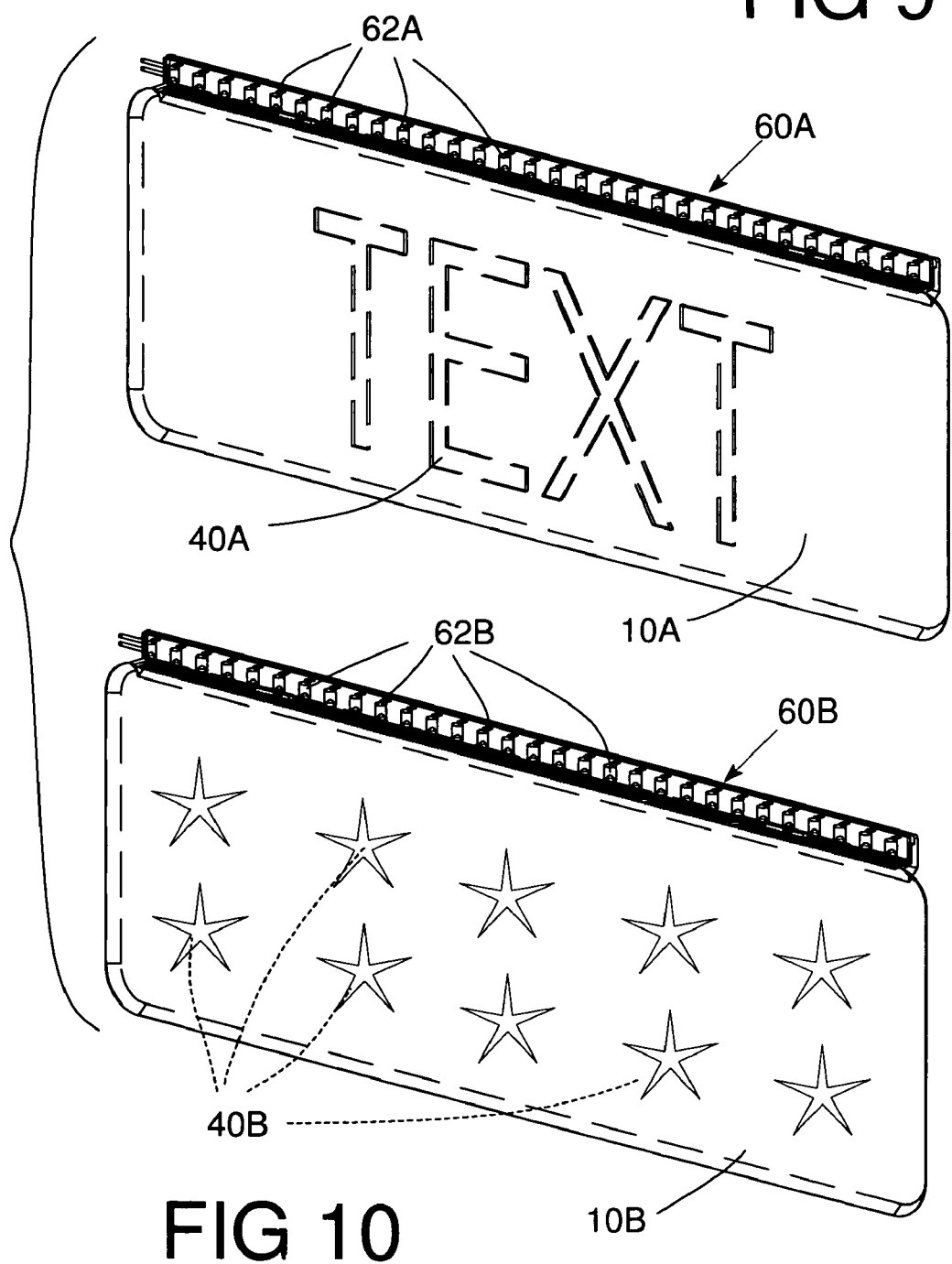
FIG. 10 is a view of the geometric designs on the two flat panels shown in FIG. 9.

Since the light transmitted through the flat panel will only be visible in the direction perpendicular to the flat panel, where the light is reflected by surface discontinuities, such as those formed by molded, etched or machined grooves, it is possible to stack flat panels back to back as shown in FIG. 9. In this embodiment, two panels 10A and 10B are mounted back to back, with separate LED arrays 60A and 60B incident upon adjacent light diffusion surfaces 50A and 50B. The light emitted by LED's 62A will be confined to the transparent panel 10A, except where it is refracted by the geometric figure 40A. Similarly the light emitted by LED's 62B will be confined to the transparent panel 10B, except where that light is refracted by geometric figure 40B. As shown in FIG. 10, the geometric or images figures 40A and 40B would typically be different in this embodiment. If the LED's 62A and 62B emit light of different colors, then the images 40A and 40B, will only refract light of the same color as the corresponding LED's 62A and 62B, so that a multicolor image or display will be visible. In this manner the resultant structure will be relatively thin and compact and can be easily fabricated.

Figure 11:
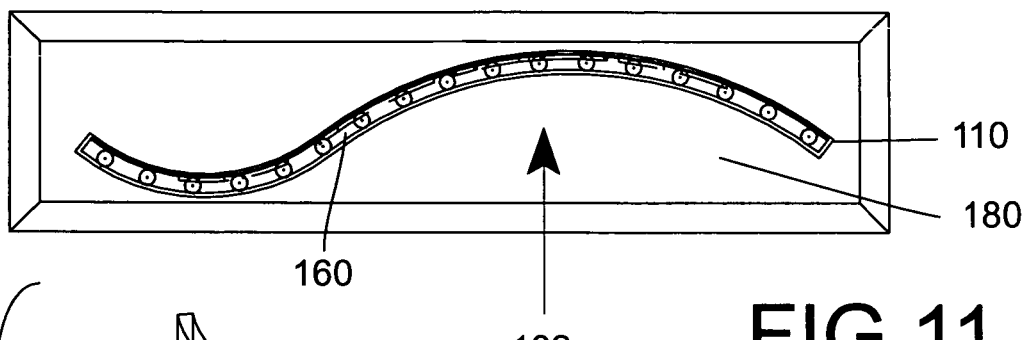
FIG. 11 is a top view of an edge lit configuration in which the panel has a curved configuration, such as a sinusoidal shape.
Figure 12:
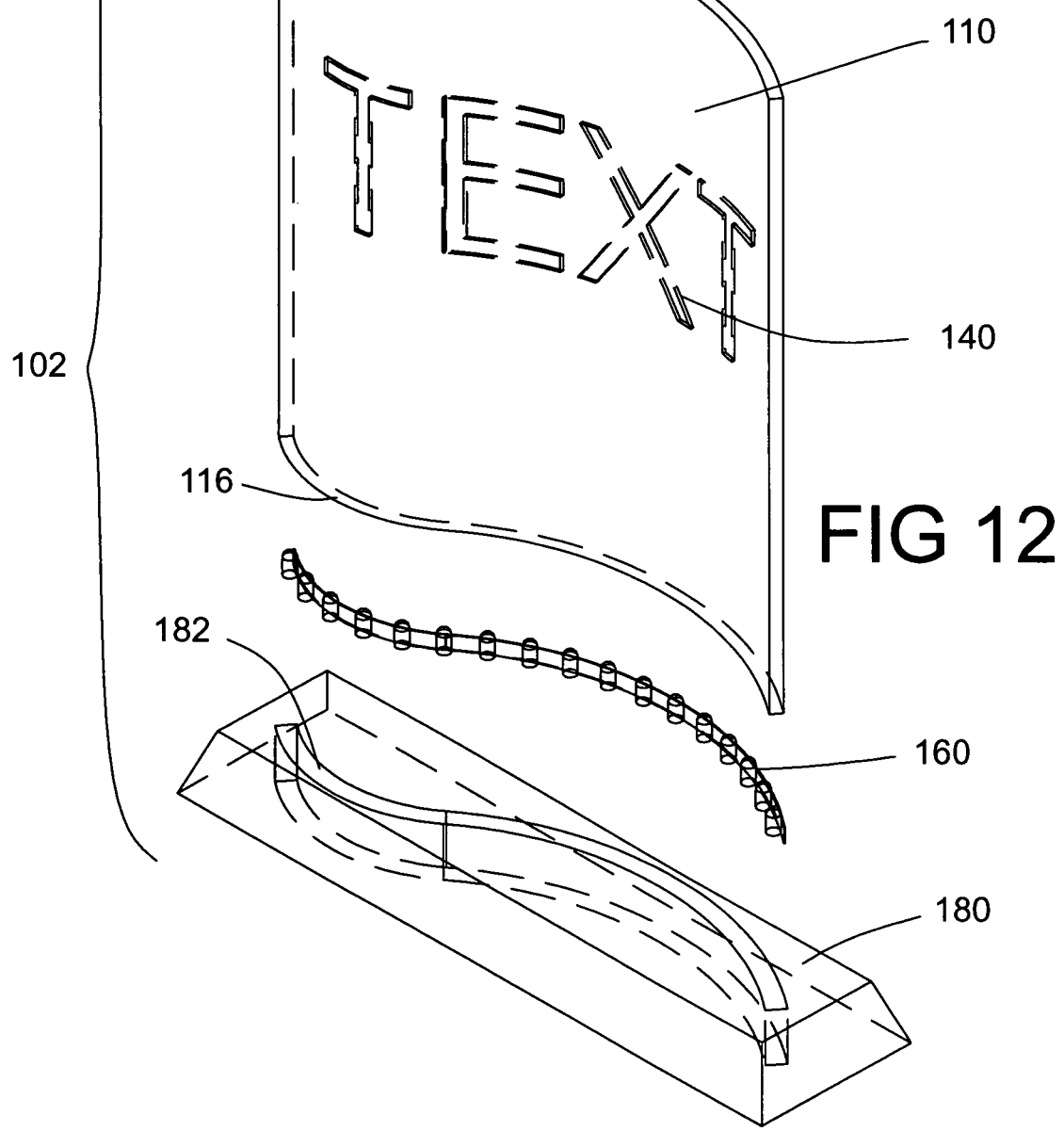
FIG. 12 is an exploded view showing the components of the curved or sinusoidal configuration also shown in FIG. 11.

The embodiment of FIGS. 11 and 12 demonstrate that the light transmissive panel does not have to be flat. The edge lit sign 102 employs a panel 110 having a curved cross section. In this embodiment, the panel 110 has a generally sinusoidal cross section, and it can be mounted in a similarly shaped slot 182 in an opaque base 180. Since the light emitting diodes in array 160 can be mounted on a flexible substrate, they can also be positioned in the slot 182 below and adjacent to the illuminated edge 116. A diffusion surface in the form of serrations or a curved surface can be formed on illuminated edge 116 in the same manner as for the flat panel embodiment. The details of this diffusion surface are not shown in FIG. 12, which is intended to primarily demonstrate that a flat panel is not required. The light passing through the diffusion surface, which would be formed on edge 116 will pass through the light transmissive material and will be incident on grooves or surface discontinuities forming the geometric figure 140, which will in turn be illuminated, in the same manner as for the earlier embodiments. The sinusoidally shaped panel 140 can be molded from an acrylic material of substantially the same composition as for the flat panel. A flat sheet of light transmissive plastic can also formed into this curved shape by heating the material. The geometric image 140, here illustrated by the representative term TEXT, can be formed during molding or as part of a secondary operation in the same manner as for the flat panels of the previous embodiments.

Figure 13:
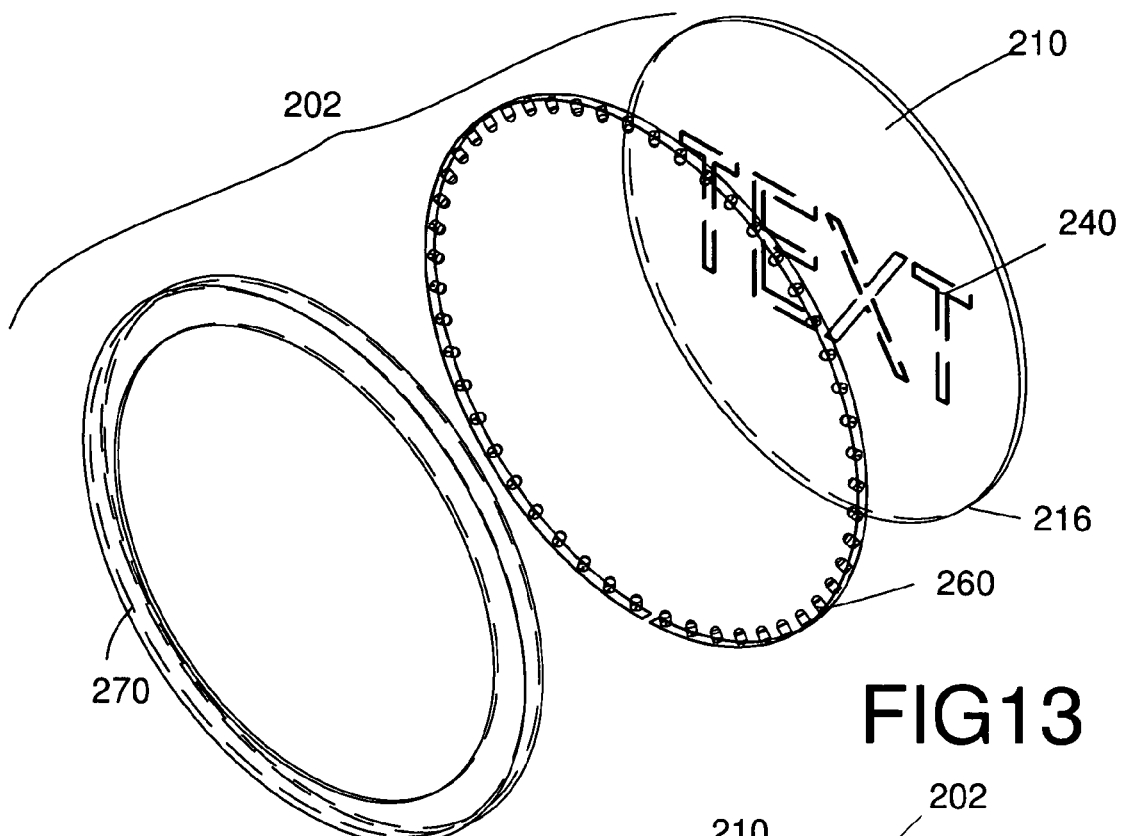
FIG. 13 is an exploded view of the main components of another embodiment in which a circular sign is surrounded by a circular array of light emitting diodes.
Figure 14:
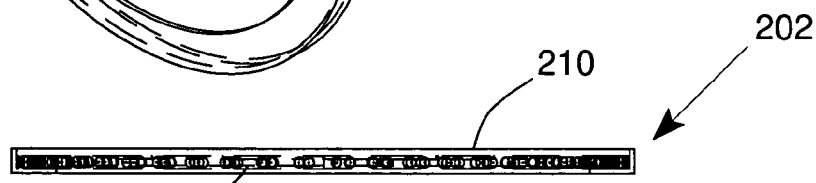
FIG. 14 is a top view of the assembled sign of FIG. 13.
Figure 15:
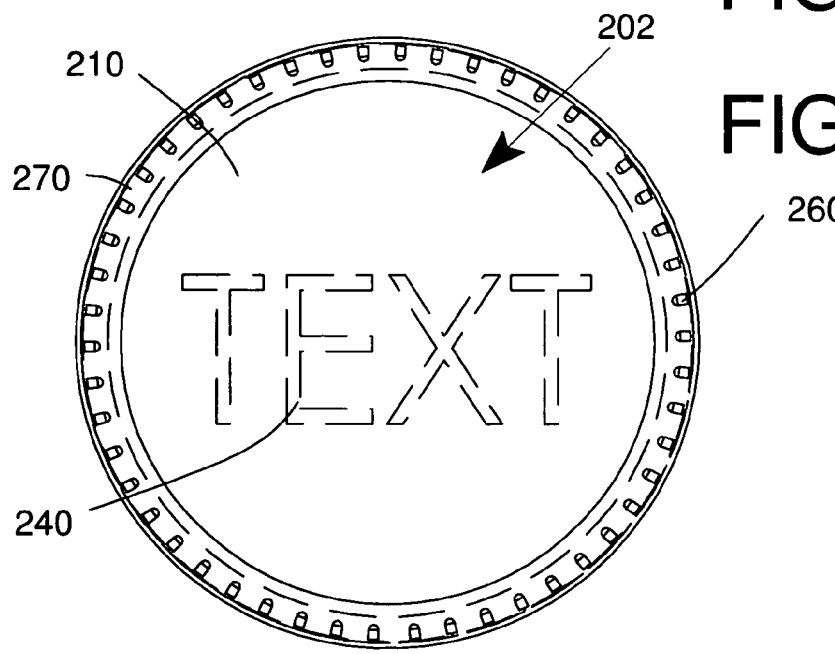
FIG. 15 is a front view of the circular sign of FIGS. 13 and 14, showing the position of the light emitting diodes around the circumference of the circular edge-lit sign.

The embodiment of FIGS. 13-15 demonstrates that the panel need not be rectangular nor is it necessary to illuminate only one edge of that panel. In the edge lit sign 202, a circular panel 210 is illuminated by an annular light emitting diode array 260 disposed around the circumference of the circular panel. As seen in FIGS. 13 and 15, the LED's in array 260 extend substantially completely around the circular panel 210. These LED's can be positioned adjacent the peripheral, circular, illuminated edge 216 with the geometric image 240 located in the center of the circular panel 210. The light emitting diodes can be hidden by an annular opaque cover 270 so that the LED array 260, shown in phantom in FIG. 15, will not be visible from the front of the sign 202. The cover 270 also includes a peripheral lip extending around its outer circumference, and this inwardly facing lip would support the annular LED array 260. Although the representative embodiment of FIGS. 12-15 shows the LED array completely encircling the circular panel 210, it should be understood, that the light emitting diodes need not be disposed completely around panel 210. For example, LED's could be arranged in a semi-circle, and depending upon the shape of the image to be illuminated, adequate lighting could still be possible. As in the embodiment of FIGS. 11 and 12, the details of the diffusion surface can be the same as that described for the embodiments of FIGS. 1-10, and the details of the diffusion surface on illuminated edge 216 are not shown in these views since they would not show up distinctly given the size of the views.

The embodiment of FIGS. 16-18 demonstrates that the LED array 360 need not be disposed on a peripheral edge of the sign 302. Here the LED array 360 is disposed in the middle of the sign and the emitted light illuminates a border formed on the edge of the sign 302. Here, the illuminated border forms an image 340 in the shape of an outlined shooting star. The LED array 360 is disposed between a light transmissive panel 310 including a recess 312 and a reflective back panel 380 including a channel 382 in which the conductive substrate on which the LED's in array 360 are positioned. The reflective back panel 380 increases the amount of light transmitted to the image. The light transmitting panel 310 and the reflective panel 380 are sandwiched together with the LED array 360 positioned therebetween. The LED array 360 is powered or controlled by conventional electrical or electronic means contained in a housing 390 on the back of the sign. It is the edges of this recess 312 that are illuminated and on which a diffusion surface of the types previously described can be formed. The emitted light shines outwardly through the panel 310 and strikes a peripheral beveled edge forming the image 340. This beveled edge is not polished and its surface is rougher than the reflective surface of the panel 310. Light is refracted through this edge to illuminate the outline forming the shooting star. A cover 370 can be provided to hide the LED array 360 if desired. The image formed by this embodiment can resemble a neon light. As seen in FIG. 18, however, the points of the star are sharp and have a radius of curvature that is smaller than can be achieved by a conventional neon light. Since the panel 310 can be molded or machined and the peripheral beveled edge forming the image 340 can be similarly fabricated, greater image definition can be achieved. Thus an image of greater clarity can be achieved or an image may be more closely duplicated than would be possible for a conventional neon light. Although none of the embodiments depicted herein is strictly limited to use as a sign, the embodiment of FIGS. 16-18 is especially suitable for other applications. For example a design, such as the representative shooting star configuration depicted therein could be used as a stand alone decoration.

Another embodiment of an edge lit panel configuration or sign 402 is shown in FIGS. 19 and 20. In this embodiment discrete light sources or LED's in a single array 460 will illuminate different geometric figures 440 and 441 is two panels 410 and 411. Both of the panels 410 and 411 are fabricated from a light transmissive material, such as an acrylic. However, as best seen in FIG. 19, each panel 410 and 411 includes a curved section so that flat sections of each panel, in which the geometric figures 440 and 441 are located, are laterally offset from the linear array of LED's 460. However, portions of each panel surface, other than the grooved geometric figures 440 and 441 are smooth or polished. These surfaces will thus reflect light so as to keep the light emitted by the LED's within the panels 410 and 411, which will function as light guides in the same manner as the panels in the previous embodiments. Diffusion surfaces 416 and 417 are located above the LED array 460. Although not shown in detail in FIGS. 19 and 20, these diffusion surfaces 416 and 417 will be configured to diffuse light from the discrete light emitting diodes, and diffusion surfaces 416 and 417 can be serrated, can have a sinusoidal shape, or can have any other shape that will diffuse or blend the light into a relatively smooth pattern to evenly illuminate the geometric figures 440 and 441 to be illuminated. These geometric figures 440 and 441 are defined by refractive surfaces formed on the panel. In the preferred embodiment, these refractive surfaces are formed by roughened grooves in the same manner as discussed with reference to the previously described embodiments. As seen in FIG. 20, the two images 440 and 441 are different. In this representative embodiment, it is only the orientation of the images that differ, so that the images can be viewed in the proper context from opposite directions. Here the representative figure TEXT will have the proper orientation when the sign 402 is viewed from opposite sides. A central barrier 480, that can be opaque, is positioned between the two panels 410 and 411 so that there will be no interference between the two illuminated images formed by geometric figures 440 and 441. An alternative version of this approach would allow the central barrier to also be illuminated in a manner that would highlight, but not interfere with the images 440 and 441. For example, small stars could be illuminated as a backdrop to the primary images 440 and 441. As seen in FIG. 19, the LED array 460 is positioned between relatively thin shelves 456 and 457, which extend below the diffusion surfaces 416 and 417. In order to maintain the intensity of the LED's transmitted through the panels 410 and 411, the shelves 456 and 457 can be coated with a reflective material or reflective sheets may be positioned beside these shelves. Such a reflective surface could also serve as a cover so that the LED's would not be directly visible. Alternatively the LED array 460 could be mounted on one of these shelves 456 or 457.

Alterations to these representative embodiments can of course be made by one of ordinary skill in the art. For example, the surface of panel may be tinted in those areas other than where the illuminated image is to be formed. If the surface has a different tint than the grooves, then the color of the image will be different from the tint on the remainder of the panel to form a different appearance. Of course the amount of tint added to the surface of the panel, must be such that most of the light incident on this tinted surface will be reflected back into the panel. Another alternative, would be to tint or color the surface discontinuities or grooves forming the geometric image to be illuminated. The color of the image or geometric figure can then be different from the color of the light emitted by the array of LED's. These, however, are merely representative examples of modifications that can be made by one of ordinary skill in the art. The embodiments depicted herein are merely representative in nature and other alternative configurations would be readily apparent to one of ordinary skill in the art. The invention is therefore defined by the following claims and is not limited to the representative embodiments depicted herein.

We claim:

1. A sign including an edge lit image, the sign comprising:
   a panel fabricated from a light transmitting material, the panel including a figure formed by at least one surface discontinuity on the face of the panel, and a light diffusion surface formed along one edge of the panel, the light diffusion surface extending transversely relative to the one face of the panel, the at least one surface discontinuity and the light diffusion surface being formed on a one-piece substrate forming the panel; and
   an array of discrete light sources comprising multiple light sources disposed side by side in a line extending between opposite ends of the panel and extending along the one edge of the panel so that light shines through the light diffusion surface to be laterally dispersed to evenly shine through panel to strike the at least one surface discontinuity to form an illuminated edge lit image conforming to shape of the at least one surface discontinuity, wherein the light diffusion surface has a depth varying between opposite ends of the array of discrete light sources and with a depth varying between adjacent individual light sources in the line extending along the one edge of the panel to evenly disperse light between the discrete light sources over the surface discontinuity, wherein the surface discontinuity comprises at least one groove recessed into one face of the panel and formed by sides formed at an acute angle relative to the one face of the panel, both the light diffusion surface and the at least one groove being formed on the one-piece substrate forming the panel, with the light diffused be the light diffusion surface striking the sides forming the at least one groove to form the illuminated edge lit image conforming to the sides of the at least one groove, and wherein
   the discrete light source are mounted on a flexible circuit, and the panel includes a shelf extending beyond the light diffusion surface and laterally beyond one face of the panel, the flexible circuit being mounted on the shelf.

2. The sign of claim 1 wherein the array of discrete light sources comprises an array of light emitting diodes.

3. The sign of claim 1 wherein the light diffusion surface comprises a series of uneven surfaces formed along the one edge of the panel.

4. The sign of claim 1 wherein the light diffusion surface comprises serrations formed along the one edge of the panel.

5. The sign of claim 1 wherein the light diffusion surface comprises a series of V-shaped grooves formed along the one edge of the panel.

6. The sign of claim 1 wherein the light diffusion surface is formed by a plurality of curved surfaces.

7. The sign of claim 1 wherein the panel comprises a molded panel and the at least one groove and the diffusion surface comprise injection molded parts of the panel.

8. The sign of claim 7 wherein the at least one groove has a rougher surface than the remainder of the surface of the panel through which the at least one groove is recessed.

9. The sign of claim 1 wherein the at least one groove comprises a machined surface having a roughness greater than the surface of the panel through which the at least one groove is recessed.

10. The sign of claim 1 wherein a beveled surface extends around a panel edge on an opposite extremity of the panel from the light diffusion surface, the beveled surface comprising a reflective surface.

11. The sign of claim 1 wherein a beveled surface around the panel edge has a rougher texture than the adjacent portions of the panel surface, so that the beveled surface refracts incident light to form an illuminated border.

12. The sign of claim 1 wherein the at least one groove comprises a refractive surface to refract incident light though a panel face opposite the one face in which the at least one groove is recessed.

13. The sign of claim 1 wherein the panel is formed of a transparent material.

14. The sign of claim 1 further including an opaque panel mounted to the panel and having a cutout conforming to the figure illuminated by the discrete light sources.

15. The sign of claim 1 wherein the one edge of the panel on which the diffusion surface is located comprises a straight edge.

16. The sign of claim 1 wherein the array of discrete light sources are positioned adjacent an internal edge of the panel, and the at least one surface discontinuity is formed along an external edge of the panel so that the external edge will be illuminated.

* * * * *